United States Patent
Foley et al.

(10) Patent No.: US 10,462,183 B2
(45) Date of Patent: Oct. 29, 2019

(54) FILE SYSTEM MONITORING AND AUDITING VIA MONITOR SYSTEM HAVING USER-CONFIGURED POLICIES

(71) Applicant: International Business Machines Corporation, Armonk, NY (US)

(72) Inventors: Sean Christopher Foley, Chelmsford, MA (US); Christopher J. Berube, Westminster, MA (US); Sagi Shechter, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/804,532

(22) Filed: Jul. 21, 2015

(65) Prior Publication Data

US 2017/0024408 A1    Jan. 26, 2017

(51) Int. Cl.
*H04L 29/06*    (2006.01)
*G06F 21/62*    (2013.01)
(Continued)

(52) U.S. Cl.
CPC .............. *H04L 63/20* (2013.01); *G06F 21/55* (2013.01); *G06F 21/604* (2013.01); *G06F 21/62* (2013.01);
(Continued)

(58) Field of Classification Search
CPC ..... H04L 63/20; H04L 63/14; G06F 21/6218; G06F 21/62; G06F 21/604; G06F 2221/2101; G06F 21/6227; G06F 21/55
See application file for complete search history.

(56) References Cited

U.S. PATENT DOCUMENTS

| | | | |
|---|---|---|---|
| 5,032,979 A | 7/1991 | Hecht et al. | |
| 6,839,852 B1 * | 1/2005 | Pantuso | H04L 41/06 380/258 |

(Continued)

OTHER PUBLICATIONS

King, Jason. "Measuring the forensic-ability of audit logs for nonrepudiation." Proceedings of the 2013 International Conference on Software Engineering. IEEE Press, 2013. (pp. 1419-1422). (Year: 2013).*

(Continued)

*Primary Examiner* — Kari L Schmidt
(74) *Attorney, Agent, or Firm* — Jeffrey S. LaBaw; David H. Judson

(57) ABSTRACT

Centralized monitoring of plural file systems that operate within or in association with an enterprise computing environment is provided. Each of the plural file systems are provided with a security policy, wherein the security policy defines one or more file system access activities to be monitored at the file system. Each file system is instrumented with a software agent that intercepts the relevant file system access activity. A centralized collector component is operative to receive from each of the plural file systems audit trail data, wherein the audit trail data is data that has been generated locally as file system access activity is intercepted at the file system by the local software agent in accordance with the applicable security policy. The collector applies the security policy against the audit trail data received from at least one of the plural file systems and, in response thereto, takes a given action.

21 Claims, 7 Drawing Sheets

(51) Int. Cl.
*G06F 21/55* (2013.01)
*G06F 21/60* (2013.01)

(52) U.S. Cl.
CPC ...... *G06F 21/6218* (2013.01); *G06F 21/6227* (2013.01); *H04L 63/14* (2013.01); *H04L 63/1408* (2013.01); *G06F 2221/2101* (2013.01)

(56) References Cited

U.S. PATENT DOCUMENTS

| | | | | |
|---|---|---|---|---|
| 6,941,472 | B2 * | 9/2005 | Moriconi | G06F 21/552 707/999.009 |
| 7,383,430 | B1 * | 6/2008 | Rambacher | G06F 9/5061 713/1 |
| 7,487,136 | B2 * | 2/2009 | Deshpande | H04L 67/16 |
| 7,770,225 | B2 | 8/2010 | Hammond et al. | |
| 7,814,075 | B2 * | 10/2010 | Sack | G06F 21/6227 707/694 |
| 8,656,167 | B2 * | 2/2014 | Bono | H04L 63/0428 713/170 |
| 8,799,225 | B2 * | 8/2014 | Vaitzblit | G06F 21/6227 707/648 |
| 9,077,611 | B2 * | 7/2015 | Cordray | H04L 41/0213 |
| 2002/0147974 | A1 * | 10/2002 | Wookey | G06F 8/61 717/176 |
| 2003/0097422 | A1 * | 5/2003 | Richards | G06F 8/61 709/217 |
| 2003/0115484 | A1 * | 6/2003 | Moriconi | G02B 6/132 726/1 |
| 2004/0015957 | A1 * | 1/2004 | Zara | G06F 9/4411 717/174 |
| 2004/0111639 | A1 * | 6/2004 | Schwartz | H04L 63/0245 726/1 |
| 2004/0111643 | A1 * | 6/2004 | Farmer | G06F 21/604 726/1 |
| 2006/0129415 | A1 * | 6/2006 | Thukral | G06Q 10/087 705/28 |
| 2007/0156659 | A1 * | 7/2007 | Lim | G06F 21/6227 |
| 2007/0162749 | A1 * | 7/2007 | Lim | G06F 21/6227 713/167 |
| 2007/0226695 | A1 * | 9/2007 | Krishnaprasad | G06Q 10/06 717/126 |
| 2008/0046964 | A1 * | 2/2008 | Muralidharan | G06F 21/6227 726/1 |
| 2009/0178111 | A1 | 7/2009 | Moriconi et al. | |
| 2009/0210427 | A1 * | 8/2009 | Eidler | G06F 11/1484 |
| 2010/0262467 | A1 * | 10/2010 | Barnhill, Jr. | H04L 12/2809 709/223 |
| 2012/0210388 | A1 * | 8/2012 | Kolishchak | G06F 21/552 726/1 |
| 2014/0165133 | A1 | 6/2014 | Foley et al. | |
| 2014/0258294 | A1 * | 9/2014 | Shulman | G06F 17/30082 707/737 |
| 2015/0248419 | A1 * | 9/2015 | Motoyoama | G06F 17/30085 726/1 |

OTHER PUBLICATIONS

Kim, Gene H., and Eugene H. Spafford. "The design and implementation of tripwire: A file system integrity checker." Proceedings of the 2nd ACM Conference on Computer and Communications Security. ACM, 1994. (pp. 18-29). (Year: 1994).*

S D.Wolthusen, "Security policy enforcement at the file system level in the Windows NT operating system family," Seventeenth Annual Computer Security Applications Conference, New Orleans, LA, USA, 2001, pp. 55-63. (Year: 2001).*

Anonymous; "Methodology and Procedure for Secure Granular Authorization and Audit Implementation in Distributed Enterprise Computing Environment"; IPCOM/000237293, Jun. 11, 2014.

Grapa, Enrique; "Comprehensive Security in Data Processing Systems—The State of the Art"; IPCOM/000151720, Published electronically, Apr. 23, 2007.

Chen et al, "Deployment Guide for InfoSphere Guardium," Chapter 1, IBM Redbooks, Mar. 2014.

* cited by examiner

FILE SYSTEM MONITORING AND AUDITING VIA MONITOR SYSTEM HAVING USER-CONFIGURED POLICIES

BACKGROUND OF THE INVENTION

Technical Field

This disclosure relates generally to securing resources in a distributed computing environment and, in particular, to the protection and auditing of file systems.

Background of the Related Art

Existing information security solutions often leave databases vulnerable to advanced hacking techniques and insider attacks. Indeed, databases have been and continue to be a primary target for external hackers and insider attacks. This is because databases contain an organization's most valuable information, including customer records, payment card data, and financial results. Statistics show that hackers are skilled at using techniques, such as cross-site scripting, to penetrate perimeter defenses and reach the database. Existing security solutions, such as intrusion detection systems, lack the knowledge of database protocols and structures required to detect inappropriate activities. Other solutions that rely on native DBMS logs, such as security information and event management (SIEM) systems, do not operate in real-time, can be evaded by users with elevated privileges (which hackers often acquire), and may introduce problematic overhead. To address these issues, it is known to provide systems to automatically monitor database transactions, and to respond in real-time to access policy violations. One such system is IBM® InfoSphere™ Guardium®, a unified, cross-platform solution that both protects databases in real-time and automates compliance auditing processes.

Database systems store structured information in an access-controlled manner. They are used for storing related, structured data, using well-defined data formats. Although solutions like IBM Guardium provide significant advantages for structured content, a large percentage of content within an enterprise is unstructured. This type of content (e.g., email, documents, images, video and audio) is stored across the enterprise (and potentially externally, e.g., using cloud-based systems, with trusted partners, and the like) in file systems. A file system uses files to store arbitrary, often unrelated data. In contrast to a database system, a file system is a much more unstructured data store.

Unstructured content often is difficult to manage, but it is rapidly growing. The existence of shared network drives exacerbates this problem. Enterprises today have a need to improve the way they manage access to and auditing with respect to such unstructured information stored in file systems, all without necessarily exposing sensitive data, and in an intelligent, efficient and cost-effective way. While there are existing techniques (e.g., anti-virus software, or home grown solutions) that are able to detect and monitor file system operations, such approaches have limited scope, and are costly and ineffective. For example, existing mechanisms do not make use of file metadata and file content analysis, do not correlate across multiple repositories, do not tie users to roles, do not support policy-based alerts, do not block access to sensitive content, and do not provide comprehensive access rights audits. Without such information, enterprises are not able to effectively ensure the integrity and protection of their sensitive data, meet regulatory compliance requirements in a cost-effective way, or scale their security systems with data volumes that are growing exponentially.

BRIEF SUMMARY

This disclosure provides for enterprise-wide file system monitoring, preferably using an appliance-based solution with lightweight software probes that are installed on file system servers combined with a centralized manager application that allows for a comprehensive and customizable set of policies to control and secure corporate file systems. The solution secures and limits attacks to or misuse of a file system, preferably through monitoring of all file system access points (local and remote) within or across the enterprise.

In one embodiment, the solution provides centralized monitoring of plural file systems that operate within or in association with an enterprise computing environment. To this end, each of the plural file systems are provided with a security policy, wherein the security policy defines one or more file system access activities to be monitored at the file system. Each file system may receive the same security policy, or different security policies (i.e., different sets of rules to be applied to the local file system access activity). Each file system is instrumented with the lightweight software agent that intercepts (or, more generally, captures) the relevant file system access activity. File access rules are enforced by the software agent. The centralized monitoring (of the sets of file servers) is provided by a security manager appliance (sometimes referred to as a "collection server" or just "collector"), which is operative to receive from each of the plural file systems audit trail data. Typically, the audit trail data is data that has been generated locally as file system access activity is intercepted at the file system by the local software agent in accordance with the applicable security policy. The audit trail data may include one or more classifiers generated by the software agent and used to classify data associated with a given file system access activity. The centralized security manager appliance stores the audit trail data received from the plural file systems. In addition, preferably the collector also applies the security policy against the audit trail data received from at least one of the plural file systems and, in response thereto, takes a given action. The given action typically is one of: issuing an alert, performing an audit activity, restricting access to a file system resource, and reporting on the file system access activity.

According to another aspect of this disclosure, preferably the collector stores (in a database) the audit trail, so for review or further analysis that file data access audit data is available to be searched, for example, for suspicious patterns or unauthorized intrusions. Storage of the audit trail may also be necessary for compliance with laws and regulations that require that audit trails of data access be stored for at least a set duration of time. To this end, and in one embodiment, one or more aggregator servers may be employed to collect and merge the audit trails from multiple collectors for storage on a single server; this has the added benefit of freeing-up data storage space on the individual collectors for newly incoming audit data.

A system that incorporates the above-described solution may also include one or more central managers that are employed, for example, to manage policy installations on the collectors, and to provide an interface for searching audit trails across the collectors and aggregators. In this manner, the central manager provides an enterprise-wide view of file system access activity against user- or system-configured security policies. The file system activity monitor thus provides for continuous, policy-based real-time monitoring of file system access across an enterprise.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
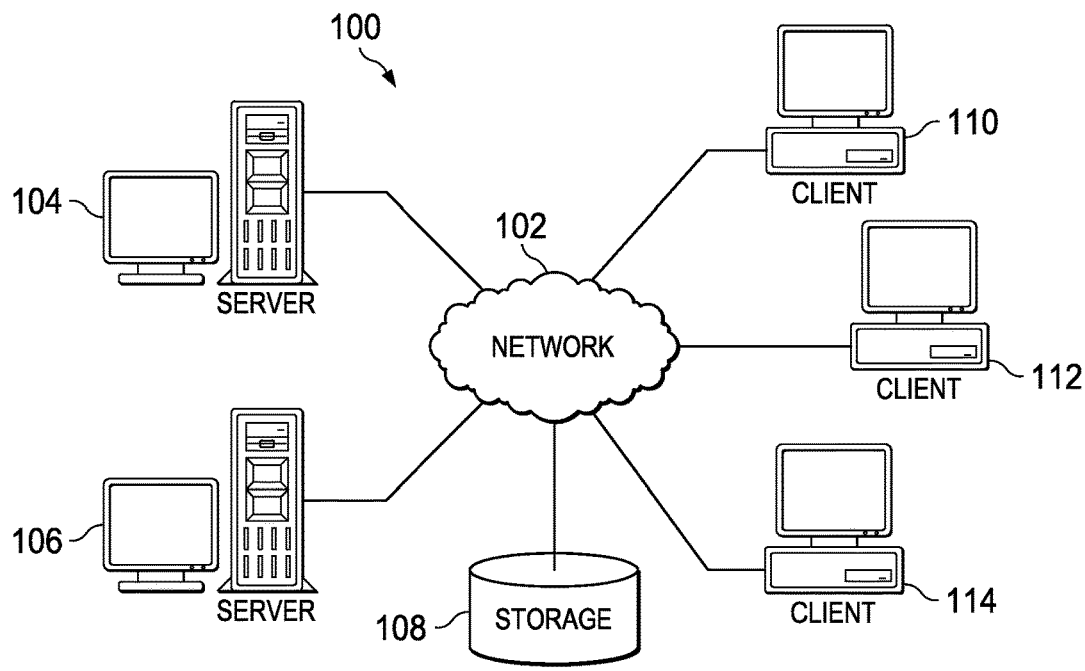
FIG. 1 depicts an exemplary block diagram of a distributed data processing environment in which exemplary aspects of the illustrative embodiments may be implemented.
Figure 2:
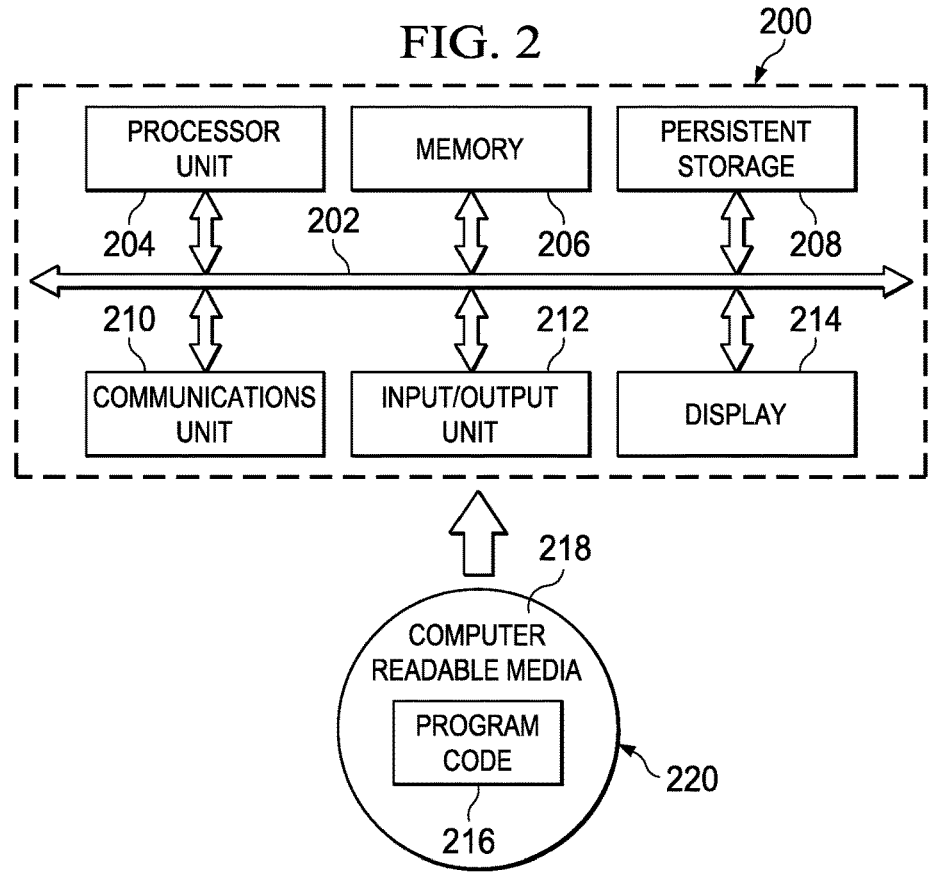
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown. Data processing system 200 is an example of a computer, such as client 110 in FIG. 1, in which computer usable code or instructions implementing one or more computing processes.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Database Access Protection and Auditing

As described above, it is known to provide systems that protect databases in real-time, and that automate compliance auditing processes. One such commercial system is IBM® InfoSphere™ Guardium. The solution supports all major database platforms, enterprise applications, and operating systems (UNIX, Linux, Windows, and z/OS), and it has been extended to distributed systems like Hadoop and supported in the cloud.

Figure 3:
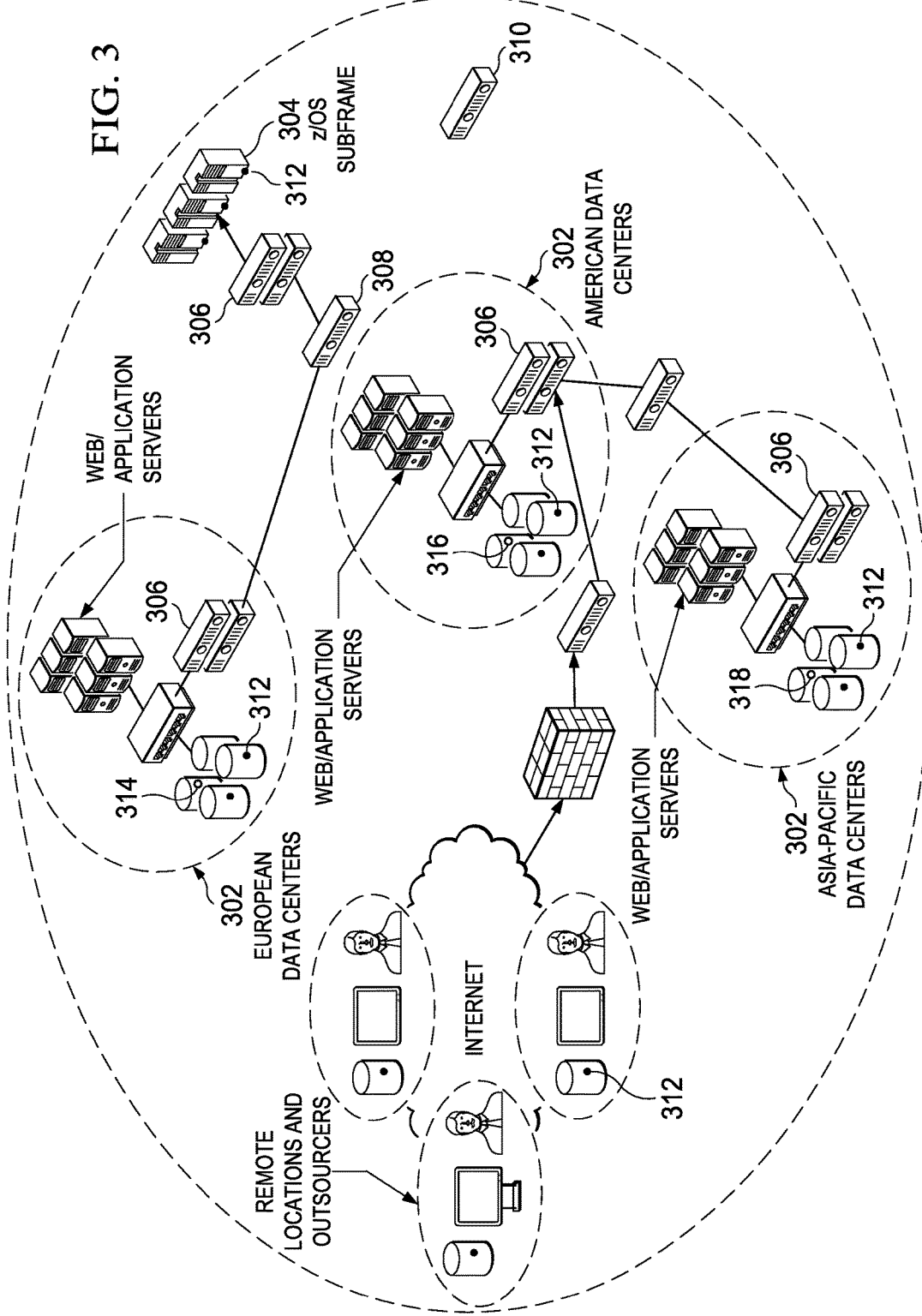
FIG. 3 depicts a known database access monitoring and auditing system.
Figure 4:
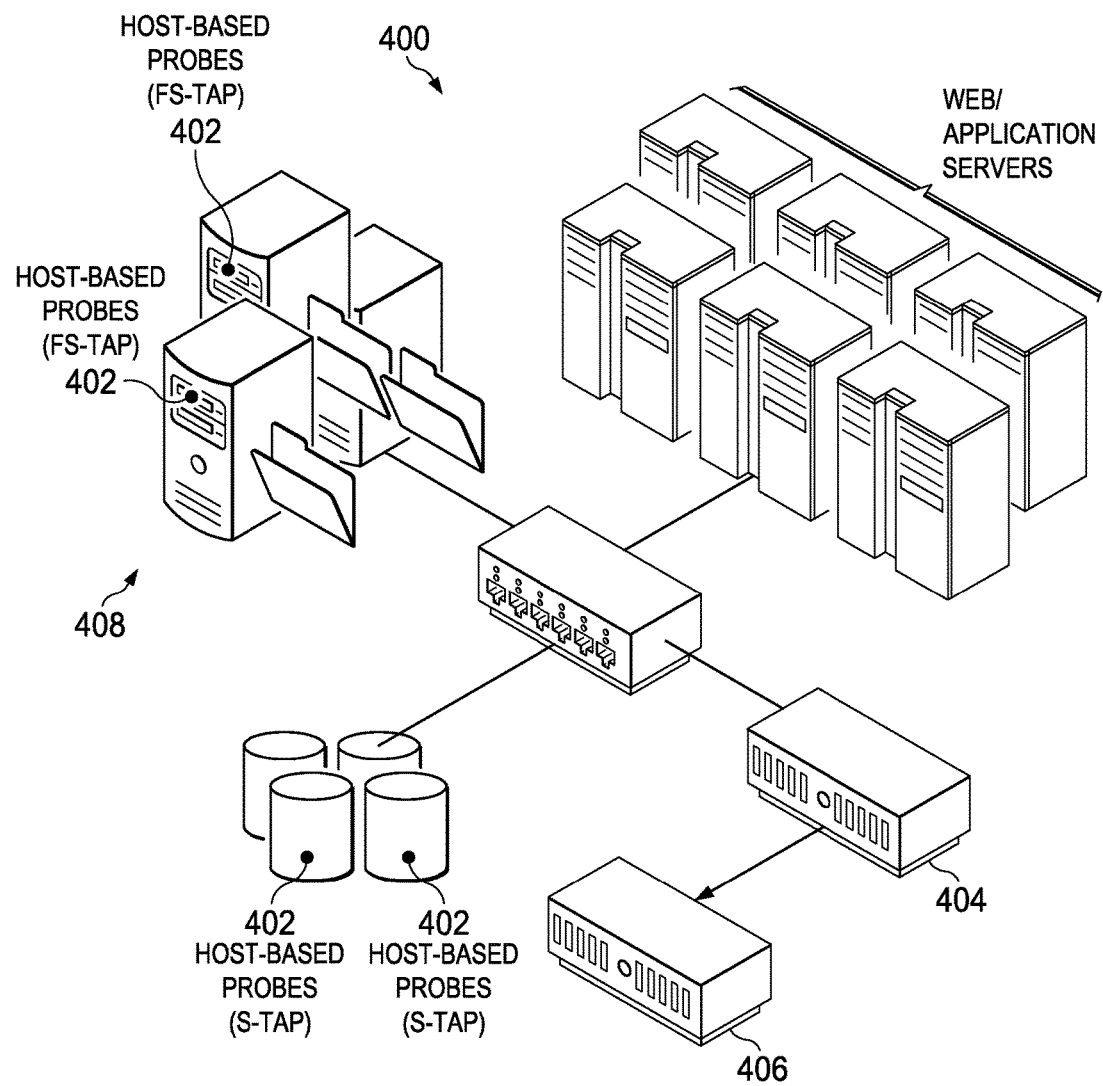
FIG. 4 illustrates an enterprise-wide embodiment of a continuous, policy-based, real-time file system activity monitor platform according to this disclosure.

FIG. 3 depicts a representative implementation of this known system (or "platform") for monitoring several databases across data centers in an enterprise 300. In this embodiment, the enterprise has several data centers 302, as well as internal financial systems 304 that are to be monitored. This architecture typically comprises a set of appliances (hardware and software) and agents (typically software) that can be configured to perform various functions. Appliances typically include the following subcategories: collectors 306, aggregators 308, and a central manager 310. A collector 306 is an appliance that is used for real-time capture and analysis of the database activity. An aggregator 308 is an appliance that is used to reporting activity from the collectors and to provide consolidated reporting from multiple collectors. A central manager (CM) 310 is a specialized functionality that preferably is enabled on an aggregator appliance. The CM function is used to manage and control multiple appliances in the database monitoring system. Agents typically include the following subcategories: a software TAP agent (S-TAP®) 312, which is installed on the database server and is used to monitor and relay the observed activity to the Guardium collector appliance. An installation manager agent (GIM) 314, which is installed on the database server and is used to facilitate agent installation and the updating and configuration modification of agents. A change audit system (CAS) agent 316, which is installed on the database server and is used to capture change audit information of configuration files and more on the database server. An instance discovery agent 318, which is installed on the database server and is used to obtain database, listener, and port information.

As shown in FIG. 3, the software TAP agents 312 may also reside in remote locations, e.g., in trusted partner installations, within the cloud, or the like. Although FIG. 3 illustrates an enterprise with a scalable multi-tier architecture comprising multiple data centers (located across multiple continents), this is not a limitation. The system components may be implemented within a single data center, across multiple data centers that are within the same geographic region, and the like.

A system of this type typically can be deployed in a variety of operational modes. Thus, for example, in a database activity monitoring mode (or in a vulnerability assessment monitoring mode), the collectors 306 monitor and analyze database activity to provide continuous fine-grained auditing and reporting, real-time policy-based alerting and database access controls. Typically, the central manager 310 acts as a single point of management for the entire deployment. With the central manager, system administrators (or other permitted individuals) can define enterprise-wide policies, alerts, queries and reports, install patches, push configuration, and perform a variety of other administrative tasks from a single console. In addition, data from multiple collectors can be aggregated to the aggregation server (the aggregator 308) to provide holistic views and generate enterprise-level reports. In addition, the system enables the software TAP agent to be configured in various ways that can affect the overall architecture of the solution. Thus, for example, the software TAP agent 312 can be configured to relay the captured information to one collector, to two or more collectors, to load balance the captured data between multiple collectors, or the like. In one basic software TAP configuration option, the software TAP agent is configured to send traffic to one collector only. Traffic includes all of the relevant activity (access and results) that the agent observes between the client (application, user, and so on) and the database. In an alternative configuration, the software TAP agent is configured to register with multiple collectors but sends traffic only to one collector at a time. In this configuration the agent sends all of its traffic to one collector, unless it encounters connectivity issues to that collector that triggers a failover to a secondary collector as configured.

File System Monitoring and Auditing Via Monitor System Having User-Configured Policies With the above serving as background, the subject matter of this disclosure is now described. According to this disclosure, the above-described monitoring and auditing platform is extended to file systems to provide enterprise-scale monitoring and auditing of file system access. In a preferred embodiment, the file system monitoring system or platform 400 comprises agents 402, collectors 404, and at least one central manager 406. This nomenclature is not intended to be limiting. File systems 408 across an enterprise (and potentially external thereto) are monitored to collect and store file access data. Preferably, and as will be described, the machines that mount the file systems themselves utilize the software file system (FS)-TAP agents 402 for this purpose. The agents collect the file access data for auditing purposes. As will be described, that data is audited by the agent according to a security policy, and the resulting audited data is sent (by the agent) to a collector 404. Preferably, collectors 404 store the data, enable the data to be searched, and are enabled for generating reports on the data. Preferably, the central manager 406 manages policy installations on the collectors, allows for searching the data on all (or some subset of) the collectors, as well as generating reports on the data of all (or some subset of) the collectors.

Figure 5:
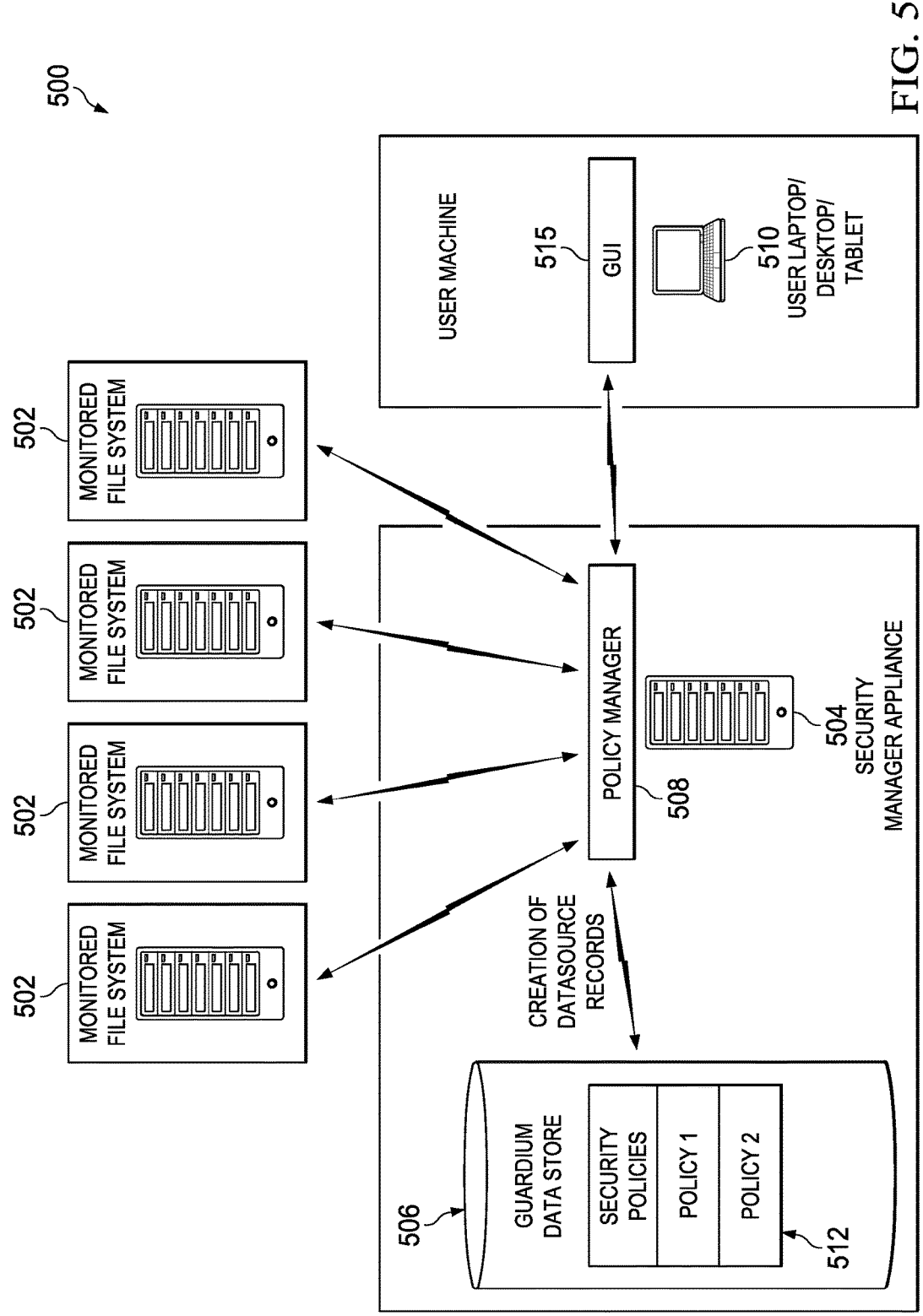
FIG. 5 depicts how the security manager appliance (or "collector") of the file system activity monitor interacts with various file systems throughout the enterprise to receive locally-collected data based on one or more configured security policies.

With reference now to FIG. 5, the basic operational configuration of the monitoring system 500 is illustrated. In this figure, the "security manager appliance" corresponds to the "collector." As noted above, the terms are used interchangeably in the context of this disclosure. As depicted, interception of file-based operations occurs on the monitored file systems 502. In this embodiment, a collector 504 includes a data store 506, and a policy manager component 508. The policy manager component 508 may execute on a collector appliance. The system 500 may also include an administrator console 510 for accessing the information maintained at the central manager 504. The administrator console 510 typically includes a graphical user interface (GUI) 515 for initiating searches against the collected data, for displaying reports, and so forth. Similar consoles may operation upon a central manager, which may be used (as described above) to manage a plurality of collectors, and for the same searching and reporting functionality across all such managed collectors (not shown).

Typically, all communications among the components occur over secure connections and/or transport protocols. There may been as many monitored file systems as exist within or across the enterprise, and additional instances of the central manager (e.g., for failover or redundancy purposes).

The policy manager 508 in the collector 504 enables policy-based filtering based on one or more security policies 512 stored in the data store 506. In particular, file access control policies 512 dictate what folders, files and other file system objects are monitored. When a monitored system 502 is booted, it connects to the collector 504 to receive policy information 512. Until the monitored system is updated or disconnected from the system, it uses the policy information as it monitors file system activity. The monitored system sends the audited data back to the collector appliance for mass storage. As noted, preferably the collector stores the data (along with the data collected from the other monitored file systems), and enables the data to be searched and reported via the administrator machine. A monitored file system 502 may have a particular policy 512 that differs from another monitored file system, or all file systems being monitored may use the same policy or policies. By managing these operations centrally, the system enables continuous, policy-based, real-time monitoring of all file access activities, including actions by privileged users. The approach also enables the enterprise to discover and classify all data being accessed, including sensitive data. The security manager-based approach facilitates data protection compliance automation on an enterprise basis.

The policy 512 that is defined on the central manager application and pushed down to the monitored file system 502 defines the file system access activity that is to be monitored. As described, the data collected by the monitored file system 502 is returned to the collector. The collector preferably stores the configuration (the policies that are being implemented), as well as the collected file system access data (sometimes referred to as the "audited" data). In other words, preferably the collector stores both the policies themselves as well as the audit trail, namely, the data that has been collected from the one or more monitored file systems.

Typically, a policy (or "security policy") has one or more rules that allow administrators (or "users") to filter for specific operations, for specific files, or the like. Preferably, the audited data includes information about the users performing a particular file system access operation, the machine wherein the file system resides, the particular file system changes, other file system constructs, and so forth. In one particular embodiment, the file system access data that is collected includes one or more of the following: file name, file size, data created, owner, read user, write user, user privileges and rights, permissions, changes or other modifications to the data or to file system metadata, timestamps, and the like. Preferably, the file system access data also includes one or more actions associated with the operation, such as: read, write, execute, create, rename, delete, change owner, permissions, properties, and the like. The file system-resident agent preferably also performs some degree of classification on the data it collects. This classification includes one or more of the following: identifying OOTB class (e.g., PCI, HIPAA, SOX, or the like), identifying the file type (e.g., HTML, text, XML, CSV, PDF, or the like), identifying the access as involving source code, a log file, or the like, and additional information as may be called for by a particular security policy. The classifying operation itself may be off-loaded in whole or in part to a collector, or off-loaded further to the central manager.

The policy manager 508 is operative to apply a particular security policy 512 to the audit trail data that is collected and received at the central manager. The nature and type of the policy may vary. Thus, a particular security policy may be used to control the file system monitoring agents to discover and classify files containing sensitive data (or sensitive data of a given type, or that is created during a particular time period, or that involves particular types of files, etc.). The security policy may simply instruct the file system monitoring agents to detect and log certain types of activity that the system has deemed potentially unauthorized or suspicious. The security policy also may define particular file system access permissions that override any native OS permissions, thereby providing another layer of security around sensitive files. Generalizing, a particular security policy identifies one or more of: who, what, when and how of a particular file system access, as well as potentially describing a given action to take (e.g., detect, log, block, notify, etc.).

Preferably, policies are oriented towards large-scale data collection for auditing purposes, or for intrusion detection, in which case notifications may be provided when sensitive information has been accessed or modified. The notifications may take the form of visible notifications, such as via the GUI, through emails or text messages, raising alerts, or any other user-configured notification mechanism. The GUI preferably includes one or more display panels through which an authorized administrative user configures a particular security policy. In the alternative, security policies are pre-configured by the system as a set of default security policies. A particular default security policy may then be extended or augmented as required. Depending on the particular security policy, the collectors or central manager also may interoperate with other enterprise systems, such as a SIEM, to provide for rules-based alerting for monitored anomalies, thresholds, correlations or reference sets, and to web-based or other application portals (e.g., for alert management, user action reporting, report management, and the like). Communication among the collectors, central manager and such other systems may utilize any request-response protocol, or take advantage of an application programming interface (API) or the like.

Figure 6:
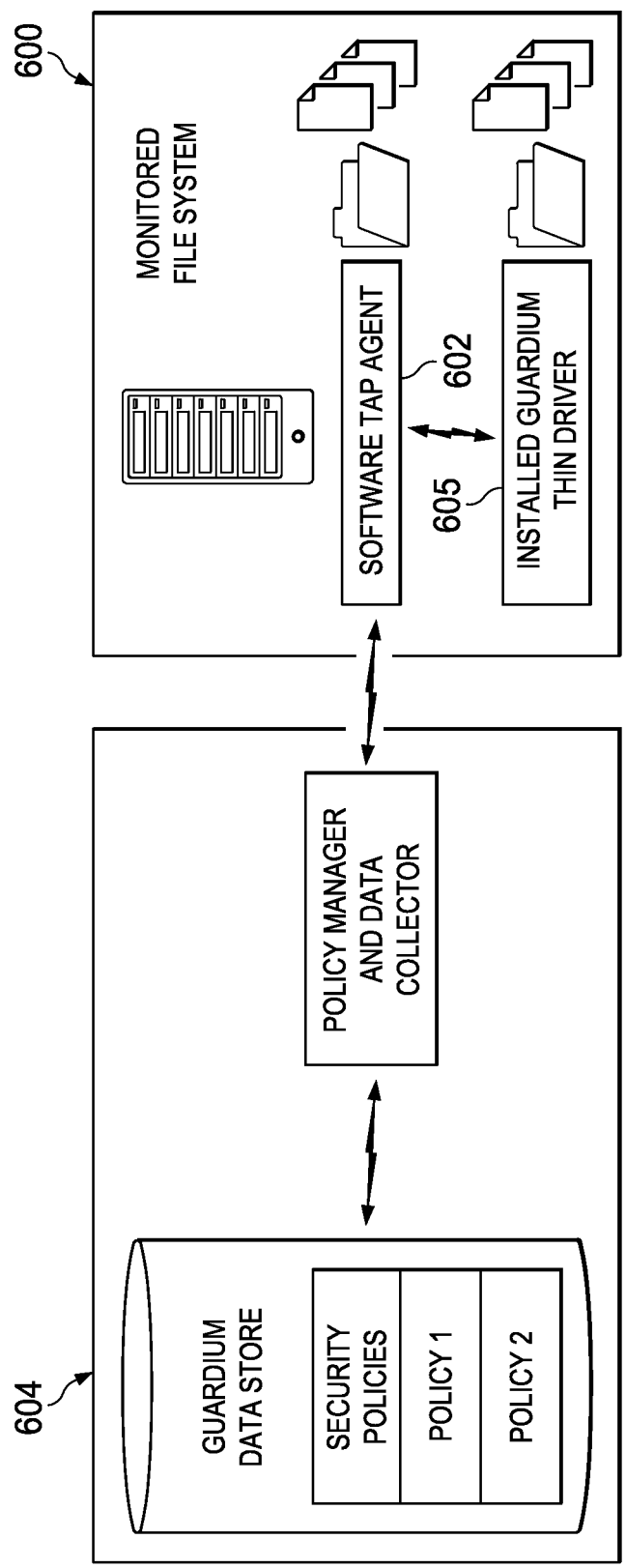
FIG. 6 depicts how a software TAP agent at a local file system interacts with the security manager appliance in one embodiment.

As seen FIG. 6, preferably the file system interception is performed in association with the software TAP agent 602 in the monitored file system 600. In one embodiment (e.g., a Microsoft® Windows OS-based operating environment), the software TAP agent 602 is extended by a thin client driver 605, which preferably resides above all other drivers (including anti-virus drivers). The software TAP agent 602 interfaces to the policy manager and data collector component 608 in the central manager 604, as previously described. As defined by the security policy file access operation, such as create file, rename file, read and write, and the like, is monitored by the driver 605. When monitoring, preferably the driver 605 provides the software TAP agent a log packet upon a file access identified in the security policy. In the alternative, the log packet is provided for all file system access and the software TAP agent applies the security policy to the log packets provided by the driver.

The software TAP agent provides the information about the file system access operation to the collector, preferably periodically and in bulk. Thus, preferably the software TAP is operative to store locally the log data or the filtered log data for some time period. It may use cache or disk store for this purpose. Typically, however, and to enable real-time or near real-time monitoring and auditing, the software TAP agent provides the data to the collector as close in time to the actual file system access. In this embodiment, the driver 605 also detects when a removable file system (such as a USB Flash drive) is used during any file access operation, and it (or the software TAP agent) can flag those operations as potentially undesirable depending on the security policy. On Linux and other UNIX-based systems, a dedicated driver may not be required, as the interception can be accomplished by the file system agent itself intercepting read/write system calls.

Figure 7:
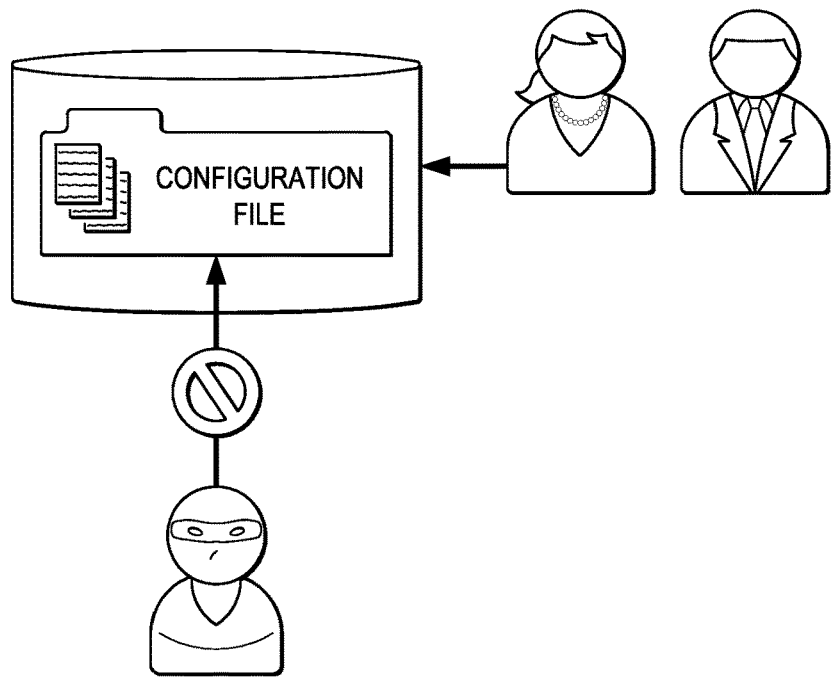
FIG. 7 illustrates a first use case for the file system monitor.
Figure 8:
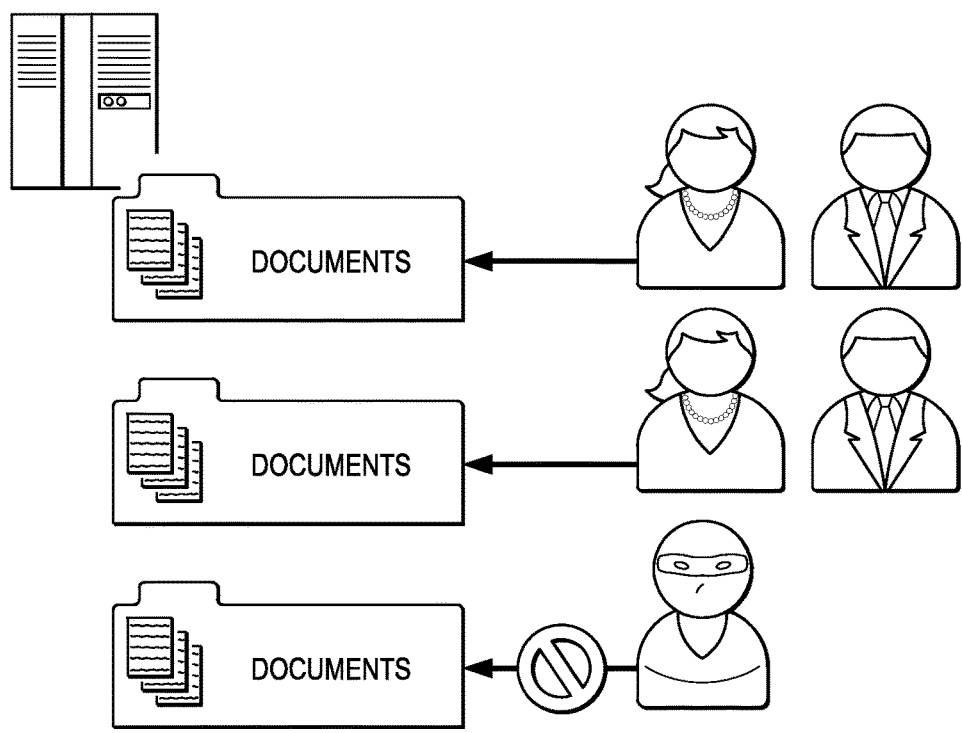
FIG. 8 illustrates a second use case for the file system monitor.
Figure 9:
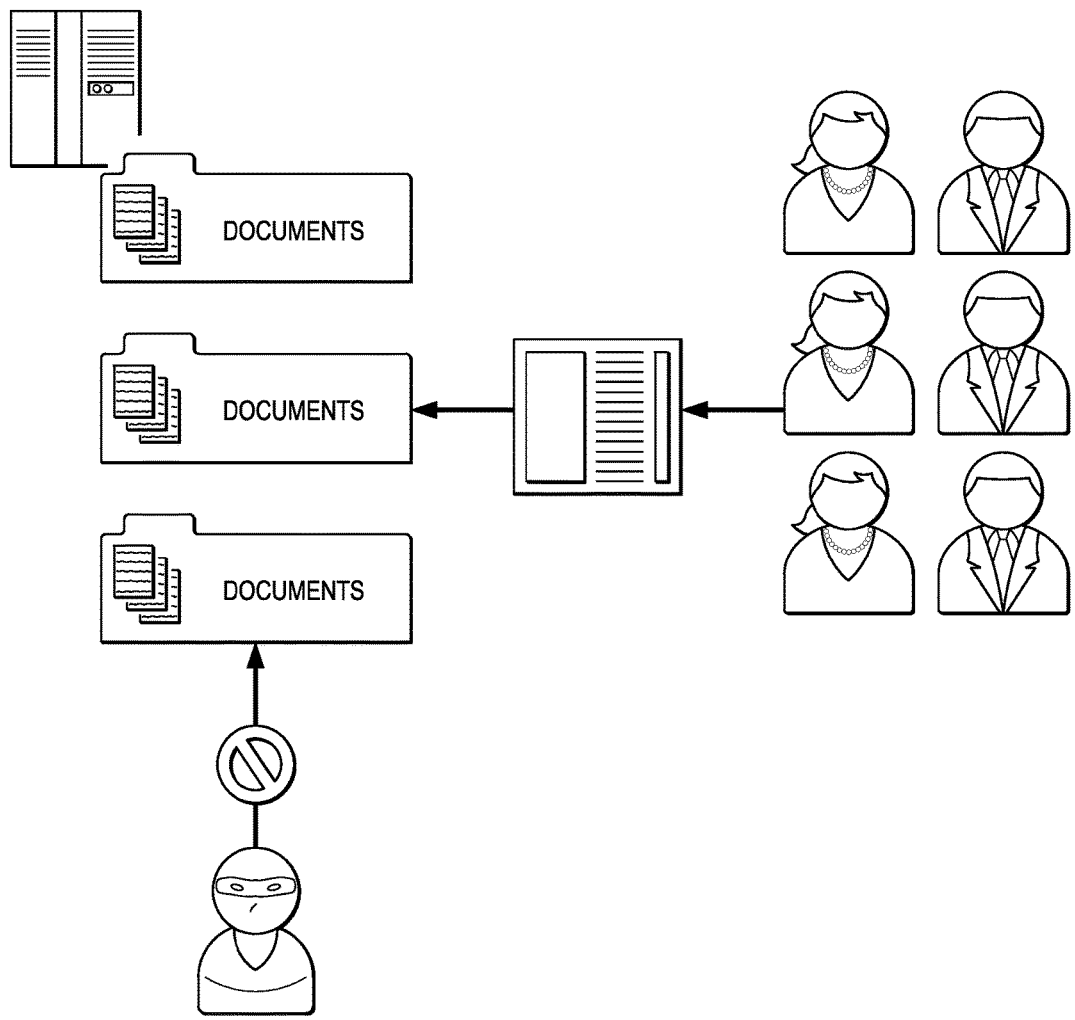
FIG. 9 illustrates a third user case for the file system monitor.

The platform may be configured by a security policy depending on the use case desired to be addressed. Thus, for example, when the enterprise is concerned that critical application files can be accessed, modified or even destroyed through back-end access to the application, the security policy may be designed to monitor configuration files, log files, source code, and the like. This use case is illustrated in FIG. 7. The policy manager may then be enabled to alert or block when unauthorized users or processes attempt access. When the enterprise needs to protect files containing personally identifiable information (PII) or other proprietary information while not impacting day-to-day operations, the platform may be configured by policy to merely monitor access to identified sensitive data. Depending on the policy configuration, the data may then be aggregated, giving the administrator a view into the activity or to otherwise provide an alert in the case of suspicious activity. For egregious activity, the system may be configured according to the policy to block access (perhaps even to a given user) to specific folders and files. This use case is depicted in FIG. 8. When the enterprise wants to protect against back-end access to documents managed by a particular application having a front-end (for normal access to the documents), the platform can be configured by the security policy to block such access. This use case is depicted in FIG. 9. Of course, these use cases are merely representative and are not intended to limit this disclosure.

There is no restriction on the particular types of classification that may be implemented by the file system activity monitoring system, or the nature and type of any classifier(s) that are used by the system to determine whether a policy rule has been implicated (e.g., by a particular event that has been monitored).

There is no restriction on the particular type of file system that may be instrumented with the software TAP agent (or agent and driver) according to this disclosure. The software TAP agent may be of the same type and form as the database (S-TAP), or it may be a standalone or distinct agent, such as FS-TAP agent disclosed above. As noted, preferably the software agent is configured by and controlled by the security policy. As used herein, a "policy" is a set of considerations that influence the behavior of a managed resource (sometimes called a "service"), in this case the file system. As noted above, a policy typically represents a set of organizational rules and the logic that the file system activity monitoring system of this disclosure uses to manage and that are applied to a specific managed resource as a service-specific policy. A security policy may be specified in a machine-readable policy specification language, such as XACML. In addition, a FS-TAP agent may include a change audit system (CAS) function that is operative to report whenever a monitored entity has changed, either in content or in ownership or permissions. In the alternative, the CAS functionality may be implemented as a standalone agent itself. This function preferably shares configuration information with the software TAP agent. The file system functionality may also include an installation manager component (or a separate agent) used to automatically install the software TAP modules.

An agent executing in a local file system typically includes an inspection engine component that runs the security policy provided by the policy manager. The inspection engine component runs the security policy as it collects and analyzes the file system access activity and traffic in real-time. File access rules supplied by the policy are enforced by the agent.

The policy manager may include an auto-discovery application or process that can be configured to probe the network, searching for and reporting on all file systems discovered.

For completeness, the following are definitions for terms and phrases described above:

A "collection server" or "collector" (or "data security manager") collects data returned from agents (e.g., software TAPs) on monitored systems and provides policy information to those agents. It stores collected information, and it enables the auditing, monitoring, reporting and alerting of file system access activities.

An "aggregation server" is an appliance to collect and merge to a single aggregation server information from multiple collection servers (collectors). A list of reports is generated.

An "administration console" is graphical interface that guides the user through systems administration tasks such as deployment, configuration, monitoring, starting and stopping applications, services, and resources.

The term "aggregator" refers to the process of collecting and merging information from multiple sources so that a complete enterprise view of information may be reported.

An "alert" is a message indicating that an exception or policy rule violation was detected.

An "audit log" is a chronological record of system activities. These logs typically provide a record sufficient to permit reconstruction, review, and examination of sequence of environments and activities surrounding or leading to operation, procedure, or event in a transaction from inception to results.

An "audit policy" is an ordered set of rules to be applied to the observed traffic between file system clients and servers.

An "audit trail" is a chronological record of events.

A "central manager" provides management of collectors and aggregators, as well as reporting and searching functionality for enterprise-wide file system security.

The notion of "central management" as used herein typically refers to using at least one central manager component that is used to monitor and control other units, which are referred to as managed units. The managed units typically either are aggregators or collectors.

The term "classification" typically refers to discovering and classifying sensitive data so that the system can make and enforce effective access policy decisions.

The term "constructs" refers to prototypes of requests that the system detects in the traffic. The combinations of commands, objects and fields included in a construct can be very complex, but each construct basically represents a very specific type of file system access request.

An "event" is a notable occurrence at a particular point in time.

An "exception" is a condition or event that has been triggered based on thresholds, values, or policies. An "exception rule" (policy rule) evaluates real-time exceptions returned by the server.

The term "intrusion detection" refers to gathering and analyzing information from various areas within a file system to identify possible security breaches, which include both intrusions (attacks from outside the organization) and misuse (attacks from within the organization).

A "policy" is a set of rules and actions that are required to be performed when certain events or status conditions occur in an environment.

A "real-time alert" is an alert triggered by a security policy rule.

A "software TAP" is a lightweight software agent installed on a file system server or system. It monitors file system access activity and forwards information about that traffic to a collector, which can be deployed anywhere on the network. A particular software TAP agent is installed on or in association with a particular file system server so it can monitor file system-related traffic that is local to that file system. This is important because local connections can provide "back door" access to the file system—and all such access needs to be monitored and audited. In addition to monitoring local connections, S-TAP can be used to monitor any network traffic that is visible from the file system server on which it is installed. Thus, in an alternative embodiment, a given software agent also can act as a collector on remote network segments, where it is not practical to install a collector appliance.

A "security policy" is a set of rules that regulate how an organization manages, protects, and distributes sensitive information.

A "SIEM" refers to a Security Incident Event Manager, which is a log-based correlation engine. The system alerts and reports here may be fully integrated with SIEM products.

A "vulnerability" refers to a weakness in system security procedures, system design, implementation, or internal controls that could be exploited to violate system security policy, a flaw or weakness in a system's design, implementation, or operation and management that could be exploited to violate the system's security policy.

The file system activity monitor here may include a vulnerability assessment application that is operative to enable the enterprise to identify and address file system vulnerabilities in a consistent and automated fashion. This assessment process evaluates the health of the file system environment and may recommends improvement by assessing file system configuration(s) against best practices and finding vulnerabilities or potential threats to file system resources, including configuration and behavioral risks, finding any inherent vulnerabilities present in the IT environment, like missing security patches, recommending and prioritizing an action plan based on discovered areas of most critical risks and vulnerabilities, and generating reports and recommendations to provide guidelines on how to meet compliance changes and elevate security of the evaluated file systems environment.

The technique of this disclosure thus provides enterprise-wide monitoring, preferably using an appliance-based solution with lightweight software probes that are installed on file system servers combined with an application codebase that allows for a comprehensive and customizable set of policies to control and secure corporate file systems. These mechanisms allows the solution to see not only traditional client server and web-based application communications, but also threats that might originate on file system servers, thereby enabling the system potentially to take action on all unauthorized access attempts. The solution is able to secure and limit attacks to or misuse of a file system through monitoring of all file system access points (local and remote). Because the above-described architecture is both network-based and host-based through appliances and software probes respectively, continually monitoring network and servers for file access activity, the solution can be deployed in a variety of operational modes to provide flexibility and complete coverage for all file system access traffic.

The subject matter herein provides numerous advantages. The approach herein provides for a centrally-managed and controlled enterprise-wide audited data file security system. The platform enables monitoring on an enterprise-wide basis in a non-invasive and non-disruptive manner irrespective of the particular file system configuration or type. The system operates cross-platform to provide continuous, policy-based, real-time (or near real-time) monitoring of all file system access activities as defined by one or more user- or system-configured security policies. The approach is dynamically scalable as the enterprise file system(s) grow or are themselves re-configured or updated, as all that is required is that the file system being monitored be instrumented with the software TAP agent (or agent and driver). All security policy configuration is managed centrally, and policies are pushed down and instantiated locally in the file system under the control of the software TAP agent.

The approach enables system-wide discovery and classification of files containing sensitive or other enterprise data, detection, logging and blocking of unauthorized or suspicious activity, the implementation of granular real-time policies identifying who, what, when and how of a particular file system access activity, and substantial visibility into all local file system access, and the like. Because of the lightweight agent approach, the system has minimal performance impact and requires no material changes to the basic operating environments of the file systems themselves. The agents preferably are operative to provide pre-packaged or default classifications for file system activities that implicate one or more regulatory or other compliance criteria (e.g., SOX, PCI, HIPPAA, etc.) or that implicate application-specific details (e.g., source code access). As noted, the approach is simply to implement, has low impact, provides or enables real-time alerting, and supports any number of file systems or file servers. The file access monitoring provides for extensible capabilities (once again based on policy), such as file metadata discovery, sensitive data classification, data activity monitoring, real-time alerts, compliance reporting, compliance workflow monitoring, blocking access, and so forth. The centralized approach enables the enterprise to create and apply policies for ongoing monitoring and protection of any type of unstructured data. A security policy may be configured and applied irrespective of where the data actually resides (the particular file system) in the enterprise.

Preferably, the collector (and preferably each collector) monitors multiple file systems (which may be disparate from one another) collectively under the control of a particular security policy, while a central manager monitors and manages the plurality of collectors. There is no limit to the number of collectors that may be used. The resulting view thus provides an enterprise-wide view of security that is much more robust than local file system-based approaches that rely on resident logs that can be easily erased by attackers or rogue insiders. Preferably, each of the collectors and the central manager is tamper-proof.

As noted above, preferably the collector provides (to the agent(s)) the one or more file access rules (of a policy) that are to be evaluated. This architecture provides a further significant advantage by enabling the file access rules to be processed on the file server itself, rather than being evaluated and triggered on other devices of the monitoring system (e.g., the collector). This ensures that file access is enforced even in the case that the agent becomes disconnected from the collector (or other portions of the monitoring system). Typically, a given file system access rule is operative with respect to one or more file system-centric parameters, i.e., parameters that facilitate storage of arbitrary unstructured file data.

Generalizing, collector and central manager functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the collector, central manager or agent functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the collector and central manager components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the file system monitoring system described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

There may be many collectors and more than one central manager, as has been described. A particular collector or central manager typically has one or more components that may be co-located or in part distributed from one another.

The file system software TAP technique described herein is not limited for use with any particular file system access protocol, and it may be applied in other file system access schemes generally.

While software-based taps are preferred, the file system agent may in the alternative be implemented using a hardware-based network tap, or span port, to duplicate the file system access activity.

The techniques herein provide for improvements to another technology or technical field, namely, file systems, as well as improvements to the functioning of distributed systems used to manage and control such file systems.

Having described our invention, what we now claim is as follows.

The invention claimed is:

1. A method to improve a file system monitoring system operating in association with plural file systems in an enterprise computing environment, comprising:
   probing the enterprise computing environment to discover the plural file systems;
   providing each of the plural file systems discovered with a software agent that runs locally in the file system to collect file system access activity local to the file system together with network segment traffic that is visible to the software agent;
   providing each of the plural file systems with a security policy, the security policy defining one or more file system access activities to be monitored and enforced at the file system by the software agent;
   receiving from each of the plural file systems audit trail data, the audit trail data having been generated locally as file system access activity is intercepted at the file system by the software agent in accordance with the security policy, the audit trail data including any network segment traffic that is visible to the software agent, and one or more classifiers generated by the software agent to classify file system activity that involves sensitive data or application-specific details; and
   storing the audit trail data received from the plural file systems; and
   applying the security policy against the audit trail data received from at least one of the plural file systems and, in response thereto, taking a given action;
   wherein the security policies for the plural file systems are managed and applied centrally for the enterprise computing environment to provide an enterprise-wide view of monitoring and auditing of file system access for the plural file systems while file access activity is collected, enforced and classified locally by the software agent.

2. The method as described in claim 1 further including sending the audit trail data to a central location remote from the plural file systems.

3. The method as described in claim 1 wherein the given action is one of: issuing an alert, performing an audit activity, restricting access to a file system resource, and reporting on the file system access activity.

4. The method as described in claim 1 wherein the audit trail data is received continuously and in real-time with respect to the file system access activity.

5. The method as described in claim 1 wherein the security policy provided to a first file system differs from the security policy provided to a second file system distinct from the first file system.

6. The method as described in claim 1 further including defining the security policy, the security policy having one or more file system-specific rules.

7. The method as described in claim 6 wherein the given action taken is based on the one or more file system-specific rules.

8. An apparatus, comprising:
   a processor;
   computer memory holding computer program instructions configured to improve a file system monitoring system operating in association with plural file systems in an enterprise computing environment, the computer program instructions comprising:
   program code to probe the enterprise computing environment to discover the plural file systems;
   program code providing each of the plural file systems discovered with a software agent that runs locally in the file system to collect file system access activity local to the file system together with network segment traffic that is visible to the software agent;
   program code providing each of the plural file systems with a security policy, the security policy defining one or more file system access activities to be monitored and enforced at the file system by the software agent;
   program code receiving from each of the plural file systems audit trail data, the audit trail data having been generated locally as file system access activity is intercepted at the file system by the software agent in accordance with the security policy, the audit trail data including any network segment traffic that is visible to the software agent, and one or more classifiers generated by the software agent to classify file system activity that involves sensitive data or application-specific details; and
   program code storing the audit trail data received from the plural file systems; and
   program code applying the security policy against the audit trail data received from at least one of the plural file systems and, in response thereto, to take a given action;
   wherein the security policies for the plural file systems are managed and applied centrally for the enterprise computing environment to provide an enterprise-wide view of monitoring and auditing of file system access for the plural file systems while file access activity is collected, enforced and classified locally by the software agent.

9. The apparatus as described in claim 8 wherein the computer program instructions further include program code sending the audit trail data to a central location remote from the plural file systems.

10. The apparatus as described in claim 8 wherein the given action is one of: issuing an alert, performing an audit activity, restricting access to a file system resource, and reporting on the file system access activity.

11. The apparatus as described in claim 8 wherein the audit trail data is received continuously and in real-time with respect to the file system access activity.

12. The apparatus as described in claim 8 wherein the security policy provided to a first file system differs from the security policy provided to a second file system distinct from the first file system.

13. The apparatus as described in claim 8 wherein the computer program instructions further include program code defining the security policy, the security policy having one or more file system-specific rules.

14. The apparatus as described in claim 13 wherein the given action taken is based on the one or more file system-specific rules.

15. A computer program product comprising computer program instructions on non-transitory computer-readable media, the computer program instructions executed by a processor to improve a file system monitoring system operating in association with plural file systems in an enterprise computing environment, the computer program instructions comprising:
   program code to probe the enterprise computing environment to discover the plural file systems;
   program code providing each of the plural file systems discovered with a software agent that runs locally in the file system to collect file system access activity local to the file system together with network segment traffic that is visible to the software agent;
   program code providing each of the plural file systems with a security policy, the security policy defining one or more file system access activities to be monitored and enforced at the file system by the software agent;

program code receiving from each of the plural file systems audit trail data, the audit trail data having been generated locally as file system access activity is intercepted at the file system by the software agent in accordance with the security policy, the audit trail data including any network segment traffic that is visible to the software agent, and one or more classifiers generated by the software agent to classify file system activity that involves sensitive data or application-specific details; and program code storing the audit trail data received from the plural file systems; and program code applying the security policy against the audit trail data received from at least one of the plural file systems and, in response thereto, to take a given action;

wherein the security policies for the plural file systems are managed and applied centrally for the enterprise computing environment to provide an enterprise-wide view of monitoring and auditing of file system access for the plural file systems while file access activity is collected, enforced and classified locally by the software agent.

16. The computer program product as described in claim 15 further including program code sending the audit trail data to a central location remote from the plural file systems.

17. The computer program product as described in claim 15 wherein the given action is one of: issuing an alert, performing an audit activity, restricting access to a file system resource, and reporting on the file system access activity.

18. The computer program product as described in claim 15 wherein the audit trail data is received continuously and in real-time with respect to the file system access activity.

19. The computer program product as described in claim 15 wherein the security policy provided to a first file system differs from the security policy provided to a second file system distinct from the first file system.

20. The computer program product as described in claim 15 wherein the computer program instructions further include program code defining the security policy, the security policy having one or more file system-specific rules.

21. The computer program product as described in claim 20 wherein the given action taken is based on the one or more file system-specific rules.

* * * * *